United States Patent [19]

Masaharu et al.

[11] Patent Number: 5,077,356
[45] Date of Patent: Dec. 31, 1991

[54] ACTIVATION ENERGY RAY-CURABLE RESIN

[75] Inventors: Makino Masaharu, Yokohama; Suzuki Akinori, Kawasaki; Sato Hisatake, Yokohama, all of Japan

[73] Assignee: Nippon Oil Company, Ltd., Tokyo, Japan

[21] Appl. No.: 651,617

[22] Filed: Feb. 6, 1991
(Under 37 CFR 1.47)

[30] Foreign Application Priority Data

Feb. 6, 1990 [JP] Japan ................................. 2-25136

[51] Int. Cl.$^5$ ............................................. C08L 75/00
[52] U.S. Cl. ...................................... 525/534; 528/49
[58] Field of Search ........................... 525/534; 528/49

[56] References Cited

U.S. PATENT DOCUMENTS 4,471,106  9/1984  Luecke et al. ....................... 525/534

Primary Examiner—Maurice J. Welsh
Attorney, Agent, or Firm—Wenderoth, Lind & Ponack

[57] ABSTRACT

A radiation-curable resin which exhibits a high curing rate and good adhesion property when used as a binder for printing inks and a binder for coating materials, obtained by reacting (a) a phenolic hydroxyl group-containing aromatic hydrocarbon resin having a hydroxyl value of 40 to 130 mg.KOH/g resin prepared by polymerizing an aromatic fraction with a phenol compound in the presence of a Friedel-Crafts catalyst with (b) a polyisocyanate in an excessive amount relative to hydroxyl group, and then reacting remaining isocyanate groups with (c) and α,β-unsaturated compound having an active hydrogen.

6 Claims, No Drawings

ACTIVATION ENERGY RAY-CURABLE RESIN

BACKGROUND OF THE INVENTION

1. Field of the Invention

The present invention relates to a novel curable resin, and more particularly to a novel curable resin which cures upon irradiation of activation energy rays such as ultraviolet rays, electron beams or the like and exhibits a high curing rate and a good adhesion property when used as a binder for printing inks or coating materials.

2. Description of Prior Art

Radiation-curable resins, which cure upon irradiation of activation energy such as ultraviolet rays and electron beams, have been given attention because of their advantageous features such as high curing rate, lower energy requirement, low environmental pollution, and therefore extensive investigations have been made on development of their applications in various fields such as printing inks, coating materials, adhesives and the like.

The curable resins are used usually as a blend with a radical polymerizable monomer such as trimethylolpropane triacrylate and optionally a radical polymerization initiator, a pigment and the like, if desired.

Among the components of the printing ink, coating material or the like, radiation-curable resins are particularly important because they give controlling influences on various properties of the resulting composition such as curing rate, viscosity, and film performance.

While multi-functional oligomers such as epoxy acrylates, urethane acrylates, alkyds or polyester acrylates are used as a radiation-curable resin, no radiation-curable resin has been known yet that is satisfactory for all of curing rate, film performance and adhesion property. For example, epoxy acrylates and urethane acrylates have high viscosities for their molecular weights and vary greatly in their viscosity. When they are used in printing inks, pigments disperse therein poorly. Because epoxy acrylates contain hydroxyl groups as well in the resin in the same number as the acryloyl groups, the resins are highly hydrophilic and thus they have a low emulsification suitability when used in, for example, printing inks. On the other hand, polyester acrylates have low curing rates and are susceptible to oxygen in the air. Conventional films obtained by photo-setting shrink to a greater extent during the setting and are disadvantageous in that their adhesion is poor when bonded on metals and plastics such as polyolefin films, although they have no problem when printed on paper.

Japanese Patent Publication Laid-Open No. 124133/1974 discloses resins obtained by esterifying DCPD/allyl alcohol copolymers with acrylic acid or methacrylic acid. This type of resin has a good adhesion property but has a poor curability, and often causes misting when used in printing inks. While improvement of characteristics of resins and increase of productivity have recently been strongly desired, it appears that the conventional multi-functional oligomer-type resins are difficult to meet such requirements. Therefore, it has been strenuously demanded to develop a novel radiation-curable resin which can form films having a high curing rate and a high performance and can be produced at a high productivity.

SUMMARY OF THE INVENTION

It is an object of the present invention to provide an activation energy ray-curable resin suitable for binders for printing inks and binders for coating materials which is free of the above-described defects that the conventional curable resins have, and which has a high curing rate and a good adhesion property for various types of substrates.

As a result of extensive investigations, the present inventors have found that the above-described problems can be solved by an activation energy ray-curable resin which can be obtained by reacting (a) a phenolic hydroxyl group-containing aromatic hydrocarbon resin having a hydroxyl value of 40 to 130 mg.KOH/g resin prepared by polymerizing an aromatic fraction with a phenol compound in the presence of a Friedel-Crafts catalyst with (b) a polyisocyanate in an excessive amount relative to the hydroxyl group, and then reacting the remaining isocyanate groups with (c) an $\alpha,\beta$-unsaturated compound having an active hydrogen, and thus completed the present invention.

DETAILED DESCRIPTION OF THE INVENTION

The aromatic fraction used in the present invention includes aromatic type petroleum fraction,.s having a boiling point within the range of 140° to 240° C., for example, cracked petroleum fractions obtained by subjecting petroleum fractions such as naphtha, gas oil and kerosene to thermal cracking such as steam cracking.

The aromatic fraction contains aromatic type coal fractions having a boiling point of 140° to 240° C., for example, heavy gas oil fraction obtained from coke oven gas.

The aromatic type fraction having a boiling point of 140° to 240° C. includes aromatic olefins having 8 to 12 carbon atoms such as styrene, alkylstyrenes, indene, alkylindenes and chroman in amounts of 35 to 70% by weight. These aromatic olefins may be used suitably alone or as mixtures.

Specific examples of the aromatic olefin having 8 to 12 carbon atoms include styrene,$\alpha$-methylstyrene, o-vinyltoluene, m-vinyltoluene, p-vinyltoluene, o-ethylstyrene, m-ethylstyrene, 0-ethylstyrene, indene, 1-methylindene, 2-methylindene, 3-methylindene and the like. Mixtures of the aromatic olefin and the above-described aromatic type petroleum or coal fraction may also be used.

As the phenol compound used in the present invention, there can be cited, for example, phenol, cresol, xylenol, t-butylphenol, nonylphenol and the like, and mixtures thereof.

In the present invention, the aromatic fraction and the phenol compound are used in proportions such that the resulting hydrocarbon resin has a hydroxyl value within the range of 40 to 130 mg.KOH/g resin.

It is preferred to use the phenol compound in an amount of 5 to 40 parts by weight, more preferably 10 to 30 parts by weight, per 100 parts by weight of the aromatic fraction.

Further, when the aromatic olefins having 8 to 12 carbon atoms or mixtures thereof are used, it is preferred to dilute them with an aromatic type solvent such as xylene or trimethylbenzene so that the monomer concentration can be 35 to 70% by weight to make an aromatic fraction and react the aromatic fraction with the phenol compound in the same proportions as described above.

As the Friedel-Crafts catalyst used in the polymerization of the aromatic fraction with the phenol compound, there can be employed boron trifluoride, aluminum chloride, boron trifluoride-phenol complex, boron trifluoride-dialkyl ether complex and the like.

The addition amount of the catalyst is preferably 0.05 to 5% by weight, more preferably 0.1 to 3% by weight. The polymerization time is preferably on the order of 10 minutes to 5 hours, and the polymerization temperature is preferably $-10$ to $+80°$ C.

After the polymerization, the catalyst is removed by decomposition with an alkali such as sodium hydroxide or sodium carbonate, and thereafter, unreacted oil and low polymers are separated by evaporation, distillation or the like, thus obtaining the phenolic hydroxyl group-containing aromatic type hydrocarbon resin according to the present invention.

In the present invention, the phenolic hydroxyl group-containing aromatic type hydrocarbon resin has a hydroxyl value of 40 to 130 mg.KOH/g resin, preferably 50 to 120 mg.KOH/g resin. If the hydroxyl value is below 40 mg.KOH/g resin, the reaction product between the polyisocyanate and the $\alpha,\beta$-unsaturated compound having an active hydrogen has a decreased curing rate. On the other hand, if the hydroxyl value exceeds 130 mg.KOH/g resin, the reaction product between the polyisocyanate and the $\alpha,\beta$-unsaturated compound having an active hydrogen has a decreased adhesion to substrates.

The softening point of the hydrocarbon resin is preferably 60° to 150° C., more preferably 80° to 140° C.

The polyisocyanate compound used in the present invention includes compounds belonging to an aliphatic polyisocyanate, an alicyclic polyisocyanate, a heterocyclic polyisocyanate or an aromatic polyisocyanate and having two or more isocyanate groups in one molecule, for example, butylene-1,4-diisocyanate, ethylene diisocyanate, trimethylene diisocyanate, tetramethylene diisocyanate, hexamethylene diisocyanate, cyclohexylene-1,2-diisocyanate, cyclohexylene-1,4-diisocyanate, 2,4-tolylene diisocyanate, 2,6-tolylene diisocyanate, 1,4-phenylene diisocyanate, 1,4-naphthalene diisocyanate, 1,5-naphthalene diisocyanate, 4,4'-diphenylmethane diisocyanate, diphenyl-3,3'-dimethyl-1-4,4-diisocyanate, xylene diisocyanate, 1-methoxyphenylene-2,4-diisocyanate, benzene-1,2,4-triisocyanate, tolidine diisocyanate, isophorone diisocyanate and the like. Mixtures of two or more of these may also be used. Usually, these polyisocyanate compounds have 4 to 30 carbon atoms.

Reaction between the phenolic hydroxyl group-containing aromatic hydrocarbon resin and the polyisocyanate compound may be carried out either without solvents or in a solvent. When the reaction is carried out in a solvent, it is preferred to use aromatic type or alicyclic type solvents from a point of view of solubility of the phenolic hydroxyl group-containing aromatic type hydrocarbon. Further considering removal of the solvent after completion of the reaction, low boiling point solvents such as benzene, toluene and methylcyclohexane are more preferred. The reaction temperature is preferably within the range of 80° to 220° C. and more preferably 80° to 200° C. when the reaciton is carried out without solvents. When the reaction is carried out in a solvent, the reaction temperature is preferably within the range of 20° to 140° C., and more preferably 50° to 120° C. The reaction time is preferably within the range of 10 minutes to 20 hours, and more preferably 30 minutes to 15 hours.

The polyisocyanate compound used in the reaction is used in such an amount that the isocyanate group exists in an amount of preferably 1.8 to 4 equivalents, more preferably 2 to 3 equivalents per equivalent of hydroxyl group in the phenolic hydroxyl group-containing aromatic type hydrocarbon resin. If the amount of the isocyanate group is below 1.8 equivalents, subsequent photo-setting of the reaction product with the $\alpha,\beta$-unsaturated compound having an active hydrogen proceeds at low rates, and on the other hand, if that amount exceeds 4 equivalents, the adhesion property of the product decreases although the rate of photo-setting is high.

Completion of the reaction between the resin and the polyisocyanate compound can be monitored by infrared absorption analysis and a timing when no absorption that is assigned to phenolic hydroxyl groups (3,300 to 3,600 cm$^{-1}$) is observed is defined as completion of the reaction.

As the $\alpha,\beta$-unsaturated compound having an active hydrogen, there can be used, for example, those compounds having 3 to 20 carbon atoms and having a carboxyl group with a carbon-carbon double bond at the $\alpha,\beta$-position relative to the carboxyl group, e.g., $\alpha,\beta$-unsaturated carboxylic acids such as acrylic acid, methacrylic acid, crotonic acid, sorbic acid and cinnamic acid, and hydroxyalkyl esters thereof such as 2-hydroxyethyl acrylate, 2-hydroxypropyl acrylate and 2-hydroxyethyl methacrylate, and mixtures of two or more of these compounds.

Reaction between the phenolic hydroxyl group-containing aromatic type hydrocarbon resin having been reacted with the polyisocyanate compound and the $\alpha,\beta$-unsaturated compound having an active hydrogen may be carried out either without solvents or in a solvent. When the reaction is carried out in a solvent, those solvents used for the reaction of the polyisocyanate can be employed. Reaction temperature is preferably is 80° to 170° C., more preferably 100° to 150° C. when the reaction is carried out without solvents. On the other hand, when the reaction is carried out in a solvent, reaction temperature is preferably 20° to 140° C., more preferably 50° to 120° C. Reaction time is preferably 10 minutes to 20 hours, more preferably 30 minutes to 15 hours.

It is preferred that the amount of the $\alpha,\beta$-unsaturated compound having an active hydrogen used in the reaction is such that the active hydrogen is present in an amount of 1.0 to 1.3 equivalents per equivalent of isocyanate group which remains in the above-described resin.

If the amount of the active hydrogen is below 1.0 equivalent, unreacted isocyanate group remains, which is undesirable from a point of view of toxicity and stability of the product. On the other hand, if it exceeds 1.3 equivalents, the product has a decreased adhesion property to substrates.

Completion of the reaction can be monitored by infrared absorption analysis and a timing when no absorption that is assigned to isocyanate groups (2,250 cm$^{-1}$) is observed is defined as completion of the reaction.

In order to carry out these reactions favorably, it is useful to use amines, organic metal compounds, alkali metal compounds and radical initiators as a catalyst. It is preferred to use, for example, triethylamine as the amine and dibutyltin diacetate as the organic metal compound in combination.

Among reaction products thus obtained, those obtained by reactions carried out in solvents are subjected after the reactions to removal of the solvents at temperatures below 120° C. under reduced pressure to obtain the objective reaction products.

The curable resin of the present invention is most suitable for use as a curable resin composition which cures with active energy rays such as radiation. Generally, it is blended with a diluent in order to control its viscosity depending on its utility, or control its curing rate or performance of the resulting cured body.

While various known solvents can be used as the diluent, it is preferred to use reactive solvents described below in order to carry out curing quickly and easily. The reactive solvent which can be used in the present invention includes compounds having a reactive double bond which can undergo crosslinking reaction with the curable resin of the present invention by heating or irradiation of radiation such as ultraviolet rays or electron beams. The reactive solvents may be used singly or as mixtures of two or more of them. As such reactive solvent, there can be used preferably acrylic acid derivatives or vinyl compounds such as styrene and the like, with the acrylic acid derivatives being particularly preferred. Specific examples of the compounds include monofunctional monomers such as methyl (meth)acrylate, ethyl (meth)acrylate, propyl (meth)acrylate, allyl (meth)acrylate, butyl (meth)acrylate, amyl (meth)-acrylate, hexyl (meth) acrylate, octyl (meth)acrylate, capryl (meth)acrylate, decyl (meth)acrylate, lauryl (meth)acrylate, myristyl (meth)acrylate, cetyl (meth)-acrylate, stearyl (meth) acrylate, benzyl (meth)acrylate, (meth)acrylate of alkylene oxide adduct of (alkyl)phenol, e.g., phenoxyethyl acrylate, cyclohexyl (meth)acrylate, dicylopentenyl (meth)acrylate and dicycolo- pentenyloxyalkyl (meth)acrylate. Further, as the bifunctional or more monomers, there can be cited crosslinkable solvents having an acrylic methacrylic radical such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, butylene glycol di(meth)acrylate, pentyl glycol di(meth)acrylate, neopentyl glycol di(meth)acrylate, hydroxypivalic acid neopentyl glycol ester di(meth)acrylate, butanediol di(meth)acrylate, hexanediol di(meth)acrylate, (di)-glycerin poly(meth)acrylate, (di)glycerin alkylene oxide poly(meth)acrylate, dihydroxymethyltricyclo[5.2.1.0$^{2,6}$]-decane di(meth)acrylate, trimethylolpropane tri(meth)-acrylate, trimethylolpropane alkylene oxide tri(meth)-acrylate, ditrimethylolpropane tetra(meth)acrylate, trimethylolethane tri(meth)acrylate, ditrimethylolethane tetra(meth)acrylate, trimethylolethane alkylene oxide tri(meth)acrylate, ditrimethylolethane alkylene oxide tetra(meth)acrylate, tetramethylolmethane tetra(meth)-acrylate, pentaerythritol tetraacrylate, tris-(acryloyloxyethyl) tri(meth)acrylate, bisphenol A alkylene oxide di(meth)acrylate, and bisphenol F alkylene oxide di(meth)acrylate.

The proportion of the diluting solvent to the curable resin of the present invention (diluting solvent : curable resin) is favorably 10 to 95 : 90 to 5 parts by weight, preferably 80 to 10 : 20 to 90 parts by weight.

When the amount of the diluent exceeds 95 parts by weight, almost no effect is observed by the use of the curable resin, thus failing to give suffcient curing property. When the amount of the diluting solvent is less than 10 parts by weight, viscosity becomes so high as to aggravate the working property, resulting in that when the composition is used in printing inks, dispersibility of pigments is aggravated and luster is deteriorated extremely.

The above-described curable resin can be suitably used as a binder for printing inks and a binder for coating materials, and may contain various pigments, fillers, additives such as thermal polymerization inhibitors, leveling agents and waxes, and the like, if desired.

In order to further accelerate curing, the curable resin of the invention may contain a curing accelerator. In most cases, addition of curing accelerators is preferred. When the above-described composition is to be cured by heating, an organic peroxide alone or in combination with a decomposition accelerator can be used as a curing accelerator, or alternatively, some types of ketone resins can be used as a heat curing accelerator. On the other hand, when the above-described composition is to be cured with irradiation of ultraviolet rays, sensitizers such as various types of benzoin ethers and benzophenone can be used as a curing accelerator.

The curable composition described above has excellent characteristics such that curing due to crosslinking reaction takes place very quickly upon irradiation of active energy rays such as ultraviolet rays and electron beams, and that cured films have excellent adhesion property and in addition high hardness, and therefore exhibit particularly superior performance when used as a binder for printing inks and a binder for coating materials.

EXAMPLES

Hereafter, the present invention will be described in more detail by examples. However, it should not be construed that the presnet invention is limited thereto.

Reference Example 1

Eight (8) parts by weight of phenol was added to 100 parts by weight of a fraction containing 43% by weight of unsaturated components and having a boiling point within the range of 145° to 190° C. from among cured petroleum fractions obtained by steam cracking of naphtha. To the mixture was added 0.6 part by weight of a boron trifluoride-phenol complex as a catalyst, and the resulting mixture was subjected to polymerization at 30° C. for 3 hours. After decomposing the catalyst with an aqueous sodium hydroxide solution, the reaction mixture was washed with water and then unreacted oil and polymers were distilled off to obtain a polymer (I). Yield of the polymer was 47% by weight. The plymer had a softening point of 113° C. and a hydroxyl value of 54 mg.KOH/g resin. Measurement of hydroxyl value was carried out according to the acetic anhydride method described in IEC Anal. Ed 17, 394 (1945).

Reference Example 2

The gas oil obtained from coal tar was distilled to obtain a fraction having a boiling point of within 176° to 190° C. This fraction contained as unsaturated components 54% of indene and methylindene, 6.8% of chroman, and 7.6% of other unsaturated components. To 100 parts by weight of this fraction were added 12 parts by weight, or 20 parts by weight, of commercially avialable cresylic acid (a mixture of 30% of phenol, 10% of o-cresol, 25% of m-cresol, 15% of p-cresol and 10% of xylenol) and a boron trifluoride ether complex. After polymerizing the mixture at 60° C. for 3 hours, the reaction mixture was subjected to the same post-treatments as in Reference Example 1 to obtain polymers (II) an (III). The resin (II) had a yield of 62% by weight, a softening point of 132° C. and a hydroxyl value of 75 mg.KOH/g resin. On the othe hand, the resin (III) had a yield of 69% by weight, a softening point of 100° C. and a hydroxyl value of 100 mg.KOH/g resin.

Example 1

In a 500 ml flask equipped with a atirrer, a condenser and a dropping funnel were charged 100 g of the resin (I) obtained in Reference Example 1 and 80 g of toluene as a solvent, and the mixture was dissolved at 80° C. Then, a mixture composed of 16.77 g of TDI (2,4-tolylene diisocyanate) as a polyisocyanate, triethylamine as a catalyst in an amount of 0.25% by weight based on sum of the weights of the resin (I) and TDI, dibutyltin acetate in an amount of 0.01% by weight based on sum of the weights of the resin (I) and TDI was added dropwise from the dropping funnel in about 15 minutes, followed by reacting the mixture at 80° C. for 3 hours. Thereafter, disappearance of the absorption at 3,300 to 3,600 $cm^{-1}$ specific to phenolic hydroxyl groups was confirmed by infrared absorption analysis. Then, a mixture composed of 11.17 g of 2-hydroxyethyl acrylate as an α,β-unsaturated compound having an active hydrogen and the same catalyst as described above was added dropwise from the same dropping funnel as described in about 30 minutes. After reacting the resulting mixture at 80° C. $cm^{-1}$ specific to NCO meaning completion of the reaction was confirmed.

The reaction product solution was distilled at 120° C. under reduced pressure to remove toluene as a solvent and thus obtain the objective activation energy ray-curable resin [A].

Example 2

An activation energy ray-curable resin [B]was obtained in the same manner as in Example 1 except that 100 g of the resin (II) obtained in Reference Example 2, 23.29 g of TDI and 15.51 g of 2-hydroxyethyl acrylate were used.

Example 3

An activation energy ray-curable resin [C]was obtained in the same manner as in Example 1 except that 100 g of the resin (III) obtained in Reference Example 2, 39.62 g of isophorone diisocyanate as a polyisocyanate and 20.68 g of 2-hydroxyethyl acrylate were used.

Solubilities of the activation energy ray-curable resins thus obtained in acrylic monomer and in acrylic oligomer were examined, and results obtained are shown in Table 1.

TABLE 1

Solubilities in Acrylic Monomer and Oligomer
(S: Soluble; PS: Partially soluble; I: Insoluble)

|  | Curable Resin | | | | | | | | |
|---|---|---|---|---|---|---|---|---|---|
|  | [A] | | | [B] | | | [C] | | |
|  | Concentration of Resin (wt. %) | | | | | | | | |
|  | 50 | 25 | 5 | 50 | 25 | 5 | 50 | 25 | 5 |
| TMPTA(1) | S | S | S | S | S | S | S | S | S |
| Kayarad MANDA(2) | S | S | S | S | S | S | S | S | S |
| Kayarad DPHA(3) | S | S | S | S | S | S | S | S | S |

TABLE 1-continued

Solubilities in Acrylic Monomer and Oligomer
(S: Soluble; PS: Partially soluble; I: Insoluble)

|  | Curable Resin | | | | | | | | |
|---|---|---|---|---|---|---|---|---|---|
|  | [A] | | | [B] | | | [C] | | |
|  | Concentration of Resin (wt. %) | | | | | | | | |
|  | 50 | 25 | 5 | 50 | 25 | 5 | 50 | 25 | 5 |
| Aronix 8030(4) | S | S | S | S | S | S | S | S | S |

Notes:
(1)TMPA: Trimethylolpropane triacrylate
(2)Kayarad MANDA: (Nippon Kayaku)
Hydroxypivalic acid neopentyl glycol ester diacrylate

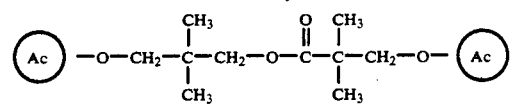

(3)Kayarad DPHA: (Nippon Kayaku)

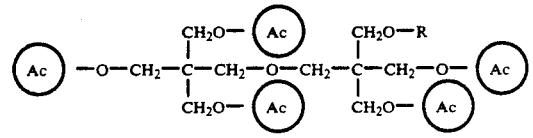

(R represents Ac or H)

(4)Aronix 8030: (toa Gosei)

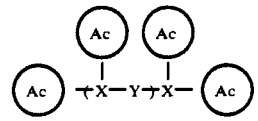

(X: Polyhydric alcohol, Y: Polybasic acid)

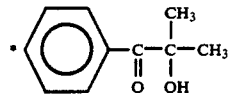

All the resins had good solubilities in various acrylic monomers and oligomers.

Next, photo-setting varnishes were prepared using these activation energy ray-curable resins and their curing rate and adhesion property were tested.

| Varnish Formulation | |
|---|---|
| Resin | 25 parts by weight |
| TMPTA | 30 parts by weight |
| Aronix 7100 (Toa Gosei polyester acrylate) | 45 parts by weight |
| Initiator Darocure 1173* | 6 parts by weight |

*
$$\bigcirc\!\!-\!\!\underset{\underset{O}{\|}}{C}\!\!-\!\!\underset{\underset{OH}{|}}{\overset{\overset{CH_3}{|}}{C}}\!\!-\!\!CH_3$$

Hydroquinone (0.1 part by weight) was added to TMPTA, and after dissolving the resin at 100° C. Aronix was mixed and then Initiator 173 was added thereto.

Examples 4 to 6

In Examples 4 to 6, varnishes were prepared using the resins [A],[B]and [C]obtained in Examples 1 to 3, respectively, as the resin in the above-described varnish formulation.

Comparative Example 1

Varnish was prepared using the resin (III) obtained in Reference Example 2 as the resin in the above-described varnish formulation.

Comparative Example 2

Varnish was prepared by replacing total amount of the resin in the above-described varnish formulation by Aronix 7100.

Table 2 shows results of the curing rate tests and Table 3 shows results of adhesion property tests.

Curing Rate

Varnish was coated on a glass plate to a film thickness of 10 μm. After irradiating ultraviolet rays, the coated glass plate was dipped in toluene for 10 seconds, and wiped with gauze. Then, the state of the coated film was observed visually.

TABLE 2

Curing Rate
Intensity of Irradiation: 18 mW/cm$^2$
Judgement:
○ Normal
Δ Partially whitened
X Wholly whitened
Curability of coated Film

| Irraadiation Time (second) | 20 | 30 | 40 | 50 | 60 |
|---|---|---|---|---|---|
| Example 4 | Δ | ○ | — | — | — |
| Example 5 | Δ | ○ | — | — | — |
| Example 6 | Δ | ○ | — | — | — |
| Comparative Example 1 | — | — | — | X | ○ |
| Comparative Example 2 | Δ | ○ | — | — | — |

Adhesion Property Tests

Varnish was coated on an aluminum plate and a soft steel plate, respectively, to a film thickness of 10 μm.. After irradiating ultraviolet rays, the films were cross cut at a pitch of 1 mm. Then the adhesion property was evaluated by tape peeling-off tests.

TABLE 3

Adhesion Property Tests
Condition of Irradiation
(Lamp: 80 W/cm one lamp,
Irradiation distance: 18 cm
Speed: 80 cm/min)
Numerals in Table 3 indicate retention ratio (%) after the tape peeling-off tests.

| Substrate | Aluminum plate (5) | Soft steel plate (6) |
|---|---|---|
| Example 4 | 85 | 100 |
| Example 5 | 80 | 100 |
| Example 6 | 80 | 100 |
| Comparative Example 1 | 80 | 100 |
| Comparative Example 2 | 0 | 0 |

Notes:
(5) Metex-treated article; Detergent for alkali dipping for nonferrous materials produced by MacDermid Co.
(6) #280 ground article From the results shown in Tables 2 and 3, it can be seen that all the systems that contained the resin obtained according to the present invention cured at high rates and gave coated films having good adhesion property.

Next, red inks were prepared using these activation energy ray-curable resin compositions, and printability tests were carried out.

Examples 7 to 9

In Examples 7 to 9, red inks were prepared using the resins [A], [B]and [C]were obtained in Examples 1 to 3, respectively, and printability tests therefor were carried out.

Comparative Example 3

Red ink was prepared using a rosin-type acrylated resin Beamset 101 (produced by Arakawa Kagaku Co., Ltd.).

Table 4 shows results obtained.

TABLE 4

Results of Ink Evaluation

| | Example 7 | Example 8 | Example 9 | Comparative Example 3 |
|---|---|---|---|---|
| Ink Composition (wt. %) | | | | |
| Resin | 30.8 | 31.7 | 30.3 | 32.1 |
| TMPTA | 45.0 | 43.9 | 45.5 | 43.5 |
| Pigment (7) | 17.2 | 17.3 | 17.3 | 17.3 |
| Initiator (8) | 6.9 | 6.9 | 6.9 | 6.9 |
| Hydroquinone | 0.1 | 0.1 | 0.1 | 0.1 |
| Results of Evaluation | | | | |
| Curing rate (9) (sec) | 12 | 10 | 10 | 15 |
| Luster 60°/60° | 52.4 | 56.7 | 53.6 | 36.2 |
| Color strength | 1.87 | 1.88 | 1.90 | 1.70 |
| Misting | 0 | 0 | 0 | 0 |

Notes:
(7) Crmine 6BT
(8) Benzophenone/4,4-bis(dimethylamino)benzophenone = 3/1
(9) Amount of irradiation: 18 mW/cm$^2$ From the results shown in Table 4, it can be seen that inks prepared using the resin obtained in the present invention cured at high rates, and gave prints having high luster and high color strength.

As will be apparent from Tables 1 to 4, coated films having high curing rate and excellent adhesion property which have not been prepared conventionally can be obtained by using the activation energy ray-curable resin of the present invention. Printing inks containing the curable resin of the present invention have excellent printability and can give prints having high luster and high color strength.

What is claimed is:

1. An activation energy ray-curable resin obtained by reacting (a) phenolic hydroxyl group-containing aromatic hydrocarbon resin having a hydroxyl value of 40 to 130 mg.KOH/g resin prepared by polymerizing an aromatic fraction with a phenol compound in the presence of a Friedel-Crafts catalyst with (b) a polyisocyanate in an excessive amount relative to the hydroxyl group, and then reacting remaining isocyanate groups with (c) an α, β-unsaturated compound having an active hydrogen.

2. The activation energy ray-curable resin as claimed in claim 1, wherein said aromatic fraction is selected from the group consisting of an aromatic type petroleum fraction having a boiling point within the range of 140° to 240° C., an aromatic type coal fraction having a boiling point of 140° to 240° C., and aromatic olefin having 8 to 12 carbon atoms, and mixtures thereof.

3. The activation energy ray-curable resin as claimed in claim 1, wherein said α,β-unsaturated compound having an active hydrogen is acrylic acid and/or methacrylic acid.

4. The activation energy ray-curable resin as claimed in claim 1, wherein said α,β-unsaturated compound having an active hydrogen is a hydroxyalkyl acrylate and/or hydroxyalkyl methacrylate.

5. The activation energy ray-curable resin as claimed in claim 1, wherein said polyisocyanate is used in such an amount that said polyisocyanate contains 1.8 to 4 equivalents of isocyanate groups per equivalent of hydroxyl group in said phenolic hydroxyl group-containing aromatic hydrocarbon resin.

6. The activation energy ray-curable resin as claimed in claim 1, wherein said α,β-unsaturated compound having an active hydrogen is used in such an amount that said active hydrogen is present in an amount of 1.0 to 1.3 equivalents per eqivalent of said remaining isocyanate group.

* * * * *

UNITED STATES PATENT AND TRADEMARK OFFICE
CERTIFICATE OF CORRECTION

PATENT NO. : 5,077,356
DATED : December 31, 1991
INVENTOR(S) : Masaharu MAKINO, et al It is certified that error appears in the above-identified patent and that said Letters Patent is hereby corrected as shown below:

On the title page, Item (19) should read --Makino, et al--.

In the heading of the patent, reverse the first and last names for each inventor, so that the names read: Masaharu Makino, Akinori Suzuki, and Hisatake Sato.

Signed and Sealed this

Twentieth Day of April, 1993

*Attest:*

MICHAEL K. KIRK

*Attesting Officer*  Acting Commissioner of Patents and Trademarks